United States Patent [19]

Strohmeyer, Jr.

[11] Patent Number: 4,957,049
[45] Date of Patent: Sep. 18, 1990

[54] ORGANIC WASTE FUEL COMBUSTION SYSTEM INTEGRATED WITH A GAS TURBINE COMBINED CYCLE

[75] Inventor: Charles Strohmeyer, Jr., Gladwyne, Pa.

[73] Assignee: Electrodyne Research Corp., Gladwyne, Pa.

[21] Appl. No.: 483,580

[22] Filed: Feb. 22, 1990

[51] Int. Cl.⁵ .................................... F23B 7/00
[52] U.S. Cl. .................... 110/234; 60/39.12; 122/1 R; 122/2; 122/7 R
[58] Field of Search ............... 122/1 R, 2, 7 R; 60/39.12, 39.33; 110/233, 234

[56] References Cited

U.S. PATENT DOCUMENTS

| | | |
|---|---|---|
| 4,506,631 | 3/1985 | Phong-Anant ............... 122/2 |
| 4,745,868 | 5/1988 | Seabury ..................... 110/234 |
| 4,875,436 | 10/1989 | Smith et al. ............... 122/7 R |

*Primary Examiner*—Edward G. Favors
*Attorney, Agent, or Firm*—William J. Ruano

[57] ABSTRACT

The invention comprising an organic waste fuel combustion and tempering gas flow control system integrated with a gas turbine combined cycle steam generating plant. The gas turbine exhaust, wherein the oxygen content is partially consumed is used to dry and support combustion of an organic fuel high in moisture content after said fuel has been dewatered and pelletized. A portion of the gas turbine exhaust gas stream dries the pelletized waste fuel while a parallel portion of the gas turbine hot gas stream is used to support combustion and furnish oxygen in the ignition zone of the pelletized waste combustor. The drying stream also tempers secondary combustion gas temperature. The two gas streams are combined downstream of the combustion zone. The regenerated combined stream is then utilized in a steam generating section to generate steam. The gas turbine exhaust flow provides the mass flow and heat required for drying and combusting the pelletized waste fuel and the heat input from the pellet firing system regenerates the gas turbine exhaust gas stream. The pellet combustion process is maintained at temperature levels which avoid formation of deleterious products of combustion during the incineration process.

7 Claims, 1 Drawing Sheet

4,957,049

ORGANIC WASTE FUEL COMBUSTION SYSTEM INTEGRATED WITH A GAS TURBINE COMBINED CYCLE

This invention relates to improved means for disposal of organic wastes through incineration after the organic wastes have been dewatered and pelletized. The incineration process is coupled to an intermediate portion of the hot gas path of a gas turbine combined cycle steam generating plant.

The incineration process improves the performance of the gas turbine power cycle which consumes a premium fuel in its combustion process through regeneration of the level of heat in an intermediate portion of the gas turbine exhaust gas stream.

The regenerated gas turbine exhaust gas stream is utilized to generate steam which can be used in a steam turbine driver or other steam consumer as an industrial load or district heating system.

The temperature of the combustion process is regulated through control of the gas turbine exhaust gas mass flow between the drying and combustion functions and suppressing combustion temperatures through the introduction of water vapor generated during the drying process into the after ignition zone of the combustion process.

The combustion temperatures are regulated to avoid formation of deleterious products of combustion during the incineration process.

BACKGROUND OF THE INVENTION

In the past incineration of waste organic sludge has been a problem even in a pelletized form due to the inability of a self contained combustion process to compensate for wide variations in quality of fuel feedstock. It has been difficult to generate sufficient heat continuously during the combustion process to vaporize the fuel high moisture content. Sufficient heat at levels suitable for fuel pre-ignition drying has not been available. Unstable conditions have resulted in variations in furnace temperatures which permit formation of deleterious products of combustion.

SUMMARY OF THE INVENTION

The present invention overcomes past problems in that the waste heat of the gas turnine cycle is utilized in the sludge combustion process as a flywheel and in a manner which segregates the drying and combusting functions. Such separation stabilizes the waste fuel ignition process so that a predictable stream of new heat energy can be generated. The net heat output generated by the sludge incineration process in addition to that required for moisture evaporation is utilized to enhance the useful energy output from the combined cycle. The gas turbine combined cycle can be operated independently of the sludge combustion process so that the latter can be made ready through energy supplied by the gas turbine before fuel ignition in the sludge combustor commences. This is done without significant losses associated with the burning of auxiliary fuels.

Figures 1, 1A:
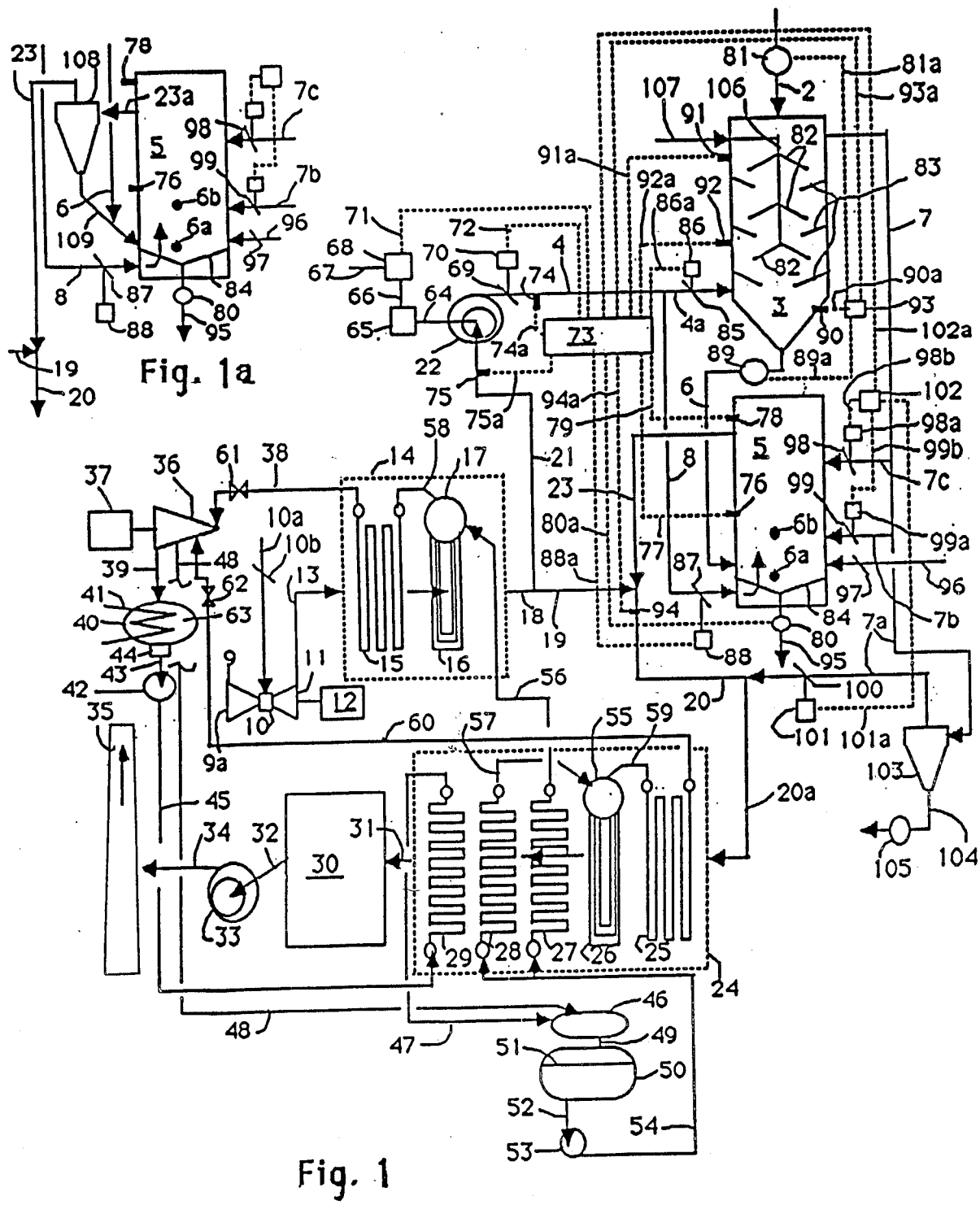
FIGS. 1 and 1a are circuit diagrams of the invention. For the apparatus and systems described herein a specific objective of this invention is to provide a means for enhancing the operation of a gas turbine combined cycle steam generating plant through reduction of the ratio of the overall cycle conventional fuel consumption to energy output through utilization of heat released by a waste sludge combustion incineration process.

A further objective is to control stability of the sludge combustion incineration process to enable a steady combustion temperature to be maintained which avoids formation of deleterious products of combustion.

A still further objective is to minimize moisture in the sludge pellet feedstock prior to ignition through drying by means of heat transfer from the gas turbine waste heat to the pellets.

A still further objective is to divert water vapor generated during the drying process away from the waste pellet ignition zone and to supply a high level source of hot gas containing sufficient oxygen to support and stabilize the waste pellet combustion process.

A still further objective is to regenerate the gas turbine exhaust waste heat stream by means of the sludge combustion process.

The invention will be described in detail with reference to the accompanying drawings wherein:

DESCRIPTION OF THE PREFERRED EMBODIMENT

FIG. 1 is a sectional diagrammatic arrangement of a gas turbine combined cycle steam plant integrated with a sludge incineration process wherein stabilized pelletized fuel feed stock 1 (not shown), a material high in moisture content, is fed through conduit 2 to dryer 3. Dryer 3 receives a stream of hot gases, in a range of from 500 to 600 F, through conduits 4 and 4a, wherein the oxygen content of said hot gases has previously been partially consumed. The flow of hot gas is upward counter to the downward flow of the pellet fuel feedstock 1.

The hot gases from conduit 4 heat pellets 1, evaporating moisture contained within said pellets. The drying process readies said pellets for ignition in combustor 5. Pellets 1 from dryer 3 pass to combustor 5 through conduit 6. Exhaust gas from dryer 3 exits through conduit 7 and enters combustor 5 through conduits 7b and 7c at zone 6b which is the secondary firing zone downstream of pellet 1 ignition zone 6a.

Hot gases from conduit 4 are fed through conduit 8 to and/or below combustor 5 pellet 1 fuel ignition zone 6a, providing oxygen and a fresh hot gas source for stabilizing ignition and combustion of pellet 1 fuel.

Conduit 7a connects conduit 7 to conduit 20a and bypasses dryer 3 gas flow around combustor 5 for controlling combustion gas temperature in combustor 5. Increases in bypass flow raise Combustor 5 gas temperature and decreases in bypass flow lower combustor 5 gas temperature.

Gas flow to secondary firing zone 6b maintains combustor 5 gas temperature within a range of 1550 to 1650 F which prevents formation of deleterious products of combustion as dioxanes and/or adhesive substances in the products of combustion which could adhere to the enclosure walls and heat transfer surfaces downstream of combustor 5.

Flow control dampers 98, 99 and 100 are provided with actuators 98a, 99a and 101 and interconnecting circuits 98b, 99b and 101a to controller 102 which positions said respective dampers in response to input from controller 73 through circuit 102a. Controller 73 coordinates damper 98, 99 and 100 positions with temperature measurements from dryer 3 at sensors 91 and 92 and from combustor 5 at sensors 76 and 78. Interconnecting circuits 91a, 92a, 77 and 79 are also provided.

The dryer 3 combustor 5 apparatus is coupled with a gas turbine combined cycle steam generating plant. Heat generated in combustor 5 reheats the gas turbine exhaust gas at a mid-point of the overall cycle.

Compressor 9 supplies atmospheric air to combustor 10. Conduit 10a supplies a gaseous or distillate fuel to combustor 10 which, after ignition, sustains combustion and continued operation of the apparatus. Combustor 10 exhausts to gas turbine 11 which powers electric generator 12. Flow control means 10b regulates supply of fuel through conduit 10a in reponse to desired power output of gas turbine 11.

Partial steam flow from superheater 15, containing 50 F superheat, is injected into the gas stream at combustor 10 (not shown) for reduction of $NO_x$ and CO in the gas turbine 11 exhaust gas.

Hot exhaust gas from gas turbine 11 discharges through conduit 13 to heat recovery boiler enclosure 14 wherein it flows over steam superheater 15 and boiler 16 tubular surfaces. The latter are connected to steam drum 17. The hot gases then pass through conduits 18 and 19, through conduit 20 to heat recovery boiler enclosure 24.

FIG. 1 is illustrative of a gas turbine having an exhaust gas temperature in the 1000 F range. For gas turbines having a lower exhaust temperature, or at the users option, a portion of or all apparatus in boiler enclosure 14 could be omitted from the cycle as such apparatus is not an essential part of this invention, In such case conduit 13 would connect directly to conduit 18.

Booster fan 22 draws a portion of the hot gas from conduit 18 through conduit 21 and increases gas pressure in conduit 4 to compensate for pressure drop through dryer 3 and combustor 5. The hot gas flowing through conduit 4, 500 to 600 F in the case illustrated, is raised to a range of from 1550 to 1650 F at combustor 5 outlet in conduit 23 connecting to conduit 20 and 20a where it mixes with the lower temperature gases from conduits 19 and 7a. The resulting gas temperature in conduit 20 is about 1068 F for the case illustrated.

The gas flowing through conduit 7 and 7a may contain particles from pellets 1 which have disintegrated as a result of the drying process. Flow of such particles into combustor 5 is acceptable.

Flow of particulate through conduit 7a can be trapped in dust separator 103, which is of the cyclonic type, before the bypass 7a exhausts to conduit 20a. Conduit 104 and blower 105 remove the collected dust from the dust collector 103 collection hopper for return to combustor 5 by means not shown.

Where substantial amounts of ash particulate are carried over to conduit 23 from combustor 5 during the combustion process, ash collection cyclone 108 would be installed in conduit 23 and as shown on auxiliary FIG. 1a for reducing the amount of ash carry over to conduit 20a. Ash from cyclone 108 is returned to zone 6a through conduit 109.

In FIG. 1a, conduit 23 of FIG. 1 is divided into two parts, conduit 23a which connects combustor 5 to dust collector 108, and conduit 23 which connects dust collector 108 to conduits 19 and 20. Dust collector 108 as shown enables combustor 5 fluid bed to be converted to the circulating type. The combustor height can be extended and the bed can expand up to the top of combustor 5. The volume of the fluidized bed is thus increased in proportion to the difference in bed depths. Gas velocities through the circulating fluid bed can be increased. The permissible furnace heat release is increased in proportion to increases in effective fluidized bed volume and gas velocity.

The principles associated with the descriptions contained herein apply to all types of fluid bed, stoker or other firing configurations.

In the case of this invention, the combustion temperature in the combustor furnace is not dependent upon the mass of ash solids recirculated in the circulating fluidized bed furnace. Furnace temperature is controlled, more particularly, by means of gas and water vapor flow from conduit 7, through conduits 7b and 7c into combustor zone 6b and bypass gas flow through conduit 7a.

Metering means 81 in conduit 2 controls pellet 1 flow rate to dryer 3. The pellets fall down over a series of cones 82 and rings 83 disposed vertically in dryer 3 and mix with hot exhaust gas from conduit 4a. Cones 82 are of the solid plate type and rings 83 are composed of screens to facilitate upward distribution of exhaust gas flow. Cones 82 and rings 83 may be provided with commercially available vibrating means (not shown) to assure a uniform rate of pellet 1 flow through dryer 3.

The upward flow of hot gas through screens 83 keep the falling pellets in a fluid state. The cones 82 are supported by column 106 attached to the combustor 5 roof and/or floor. Conduit 107 conveys lancing steam through column 106 which periodically is jetted over cone 82 surfaces to dislodge any pellet buildup on the cone surfaces.

Metering means 89 controls the flow rate of pellet 1 material through conduit 6.

Metering means 81 and 89 coordinate pellet 1 flow, to prevent a buildup of pellet 1 material in dryer 3, responsive to level measurement at the base of dryer 3 and as measured by probe 90.

Controller 93 receives a level signal from sensor 90 through circuit 90a and a loading signal from controller 73 through circuit 93a which are then converted to demand signals for metering means 81 and 89 and forwarded to metering means 81 and 89 through circuits 81a and 89a.

Combustor 5 floor 84, as illustrated, is of the fluidized bed type. Other fuel supporting means as grates or stokers can be employed as a substitute for the fluidized bed floor 84.

Alternatively, dryer 3 may of the fluidized bed type.

Floor 10, as illustrated in U.S. Pat. No. 4,505,209 issued Mar. 19, 1985, is representative of the construction which can be employed for the fluidized bed supporting structure for dryer 3 and combustor 5. The gas and pellet 1 flow paths specified above for dryer 3 and combustor 5 would not change.

For purposes of illustration, dryer 3 and combustor 5 are shown as separate vessels. The functions of the individual components 3 and 5 could be combined in a single unit employing the principles outlined in this invention.

Conduit 95 conveys residual ash from the combustion process away from floor 84. Metering means 80 seals the hot gases within combustor 5 permitting the ash residual to escape through volumetric flow control means.

Metering means 80 is connected to controller 73 through circuit 80a to coordinate ash volumetric displacement with metering mean 81 and 89 controlling pellet 1 feed rate.

Booster fan 22 exhaust gas flow may be controlled by booster fan 22 variable speed control as is illustrated. Fan 22 is driven by motor 65 through drive shaft 64. Motor 65 is of the stepping speed type. Circuit 66 furnishes characterized electric power to motor 65 responsive to controller 73 through circuit 71 which in turn regulates stepping motor controller 68. Circuit 67 supplies line current to controller 68 which is converted as required by controller 68 to regulate speed of motor 65 through circuit 66.

Controller 73 is responsive to pressure differential across booster fan 22 as is measured by pressure sensing points 74 and 75. Circuits 74a and 75a connect sensing points 74 and 75 to controller 73.

Where a constant speed booster fan 22 is employed, controller 68 with motor speed stepping accessories are not required. In such case booster fan 22 outlet damper 69 with damper positioner 70 would be positioned by controller 73 through circuit 72 responsive to pressure drop across booster fan 22 as measured by pressure sensing points 74 and 75. Exhaust gas flow rate through booster fan 22 is characterized to pressure differential measurement in controller 73.

Control of exhaust gas flow through booster fan 22 controls total exhaust gas flow to both dryer 3 and combustor 5. Dampers 85 and 87, with position actuators 86 and 88, proportion conduit 4 gas flow between dryer 3 and combustor 5. Damper 85 and 87 position set points in actuators 86 and 88 are regulated 73 through interconnecting conduits 86a and 88a, responsive to gas temperature sensors 91 and 92 in dryer 3 and 76 and 78 in combustor 5.

Gas temperature sensor 94 in conduit 20 sends a measurement signal through circuit 94a to controller 73 which signal is integrated with temperature measurements from sensors 91, 92, 76 and 78 to control gas temperature in conduit 20 at a level required to produce adequate steam flow in superheater 25 and/or steam generating section 26.

Controller 73 incorporates logic means for integrating pellet 1 fuel and hot gas flow rates and for coordinating the overall process to sustain stable combustion of pellets 1 as well as to maintain required gas temperatures at the respective temperature measurement points in dryer 3, combustor 5 and conduit 20, all as illustrated in Table 1 below. While Table 1 is for one specific set of conditions, it is contemplated that such conditions will vary to accommodate specific needs of pellet 1 variable moisture composition and that controller 73 set points may be adjusted to accommodate such variations through reapportionment of gas flow among the gas circuits 4a,7a,7b,7c 8,19 along with changes in pellet 1 firing rate.

Heat recovery boiler enclosure 24 contains low pressure superheater 25 with steam drum 55, steam generator 26, economizers 27, 28 and 29 located serially in the gas flow path. Exit gas temperature at economizer 29 outlet is in a range of 220F.

Optional induced draft fan 33 compensates for pressure drop through dust collector 30 and steam generator enclosure 24. Fan 33 minimizes loss of power output from gas turbine 11. Fan 33 connects to stack 35 through conduit 34.

Steam turbine 36, powering electric generator 37, may comprise a single unit or multiple units to permit a staged development and construction program for the combined cycle incorporating the dryer 3 and combustor 5 apparatus.

Steam turbine 36 is of the multiple steam injection, extraction type. The turbine may be condensing or non-condensing depending upon the demand for auxiliary steam as for district heating or industrial use. The condensing application is illustrated in FIG. 1.

Steam turbine 36 receives steam from superheater 15 through conduit 38 and from superheater 25 through conduit 60. Conduits 38 and 60 incorporate steam flow control means 61 and 62 respectively for regulating steam flow to turbine 36 in response to steam availability from drums 17 and 55 respectively. Steam turbine 36 exhausts to condenser 40 through conduit 39. Cooling water circuits 41 absorb the heat of vaporization in the exhaust steam from turbine 36 which converts said exhaust steam to condensate. Said condensate collects in hotwell 44 from whence it is pumped through conduit 43 by condensate pump 42. Pump 42 discharges through conduit 45 to low temperature condensate economizer 29 where the outlet condensate is heated to approximately 255 F.

Economizer 29 discharges to deaerator 46 through conduit 47 wherein any residual oxygen in the condensate is removed through spraying the condensate into a saturated steam zone and cascading the condensate down over a series of trays (not shown). The oxygen is removed through a vent (not shown). Steam extracted from turbine 36 passes through conduit 48 to deaerator 46 to heat the incoming condensate from conduit 47 and to maintain the steam in the deaerator at saturation conditions.

Heated and deaerated condensate from deaerator 46 passes through conduit 49 to feedwater storage tank 50 which provides a reserve feedwater supply to accommodate surges in the feedwater system. Water level 51 is illustrative of the storage capacity. Feedwater is drawn from tank 50 by feedwater pump 53 through conduit 52. Pump 53 discharges through conduit 54 to economizers 27 and 28. Means, not shown, regulate the feedwater flow rate selectively to economizers 27 and 28 in response to water level in steam drums 17 and 55 respectively, holding water levels relatively constant in the respective vessels 17 and 55. Conduit 56 connects the outlet of economizer 27 to drum 17 and conduit 57 connects the outlet of economizer 28 to drum 55.

Conduit 58 connects steam drum 17 to superheater 15. Conduit 59 connects steam drum 55 to superheater 25. Steam drums 17 and 55 are provided with moisture separation means (not shown) for minimizing moisture carryover to superheaters 15 and 25 respectively, reducing any solids carryover from the drum water to the superheaters.

Operation of the apparatus is as follows: The gas turbine assembly 9, 11 and 12 is initially rolled from an idle position by means (not shown) as a motor drive. Fuel is injected through conduit 10a and ignited. Atmospheric air entering compressor 9 at 9a expands from combustor 10 into gas turbine 11. Expansion is accelerated through the firing of fuel in combustor 10. As rotation accelerates, more air flow is delivered to combustor 10 and gas to turbine 11 in response to increases in fuel flow. The hot gases from turbine 11 pass through conduit 13 to warmup the equipment in the downstream gas path. Dryer 3 and combustor 5 are inoperative at this time.

When assembly 9, 11 and 12 reach a speed synchronous with the alternating current of the electrical system (not shown) to which electric generator 12 is connected, the electrical output of generator 12 is physically connected to said electrical system through breaker means (not shown), permitting gas turbine 11 to be loaded at constant speed through increases in fuel rate through conduit 10a. Gas temperature through conduit 13 increases, further heating the downstream apparatus in the gas flow path between conduit 13 and stack 35.

Prior to firing of combustor 10, the feedwater and condensate cycles were made ready by filling the system to required water levels and maintaining appropriate fluid flows to drums 17 and 55 and deaerator storage tank 50 to maintain prescribed water levels. Standard bypass means (not shown) are provided to permit operation of condensate and feedwater pumps 42 and 53 under low load conditions. Gas fans 33 (if included) and 22 are started when required to sustain gas flow through the system.

As steam pressure rises in the boiler systems 17 and 55, steam is vented adjacent to flow control means 61 and 62, by means (not shown) to warm up conduits 38 and 60. When an appropriate pressure and superheat temperature are reached at flow control means 61 and 62, steam is admitted to turbine 36 to start it rotating, raising speed of the turbine 36 and generator 37 to the generator synchronous speed for connection to the electrical system (not shown), and loading of the unit in parallel with the gas turbine generator set.

Early in the startup operation, prior to the time of firing the gas turbine combustor 10, condenser 40 has been made ready for operation, vacuum has been drawn in steam space 63 by mechanical vacuum producing means (not shown), and oxygen concentrations in the condensate have been reduced to a working level through recirculation (not shown) of condensate back to the condenser 40 steam space 63 and polishing demineralizer means (not shown).

The gas turbine combined cycle can be operated independently of the pellet dryer 3 combustor 5 apparatus.

The dryer 3 combustor 5 apparatus would be cut into service for gas turbine combined cycle loads in excess of 60 percent of rating. At such time apparatus 3, 5 would be in a hot ready state. Depending upon the characteristics of dryer 5, supplemental fuel, as gas or oil, can be injected through conduit 96 and flow control means 97 and ignited to assist in the initial ignition of pellet 1 flow stream passing through the ignition and combustion zone 6a of combustor 5 up to the time that pellet ignition can be sustained from energy generated solely by the firing of the pellets themselves.

Table 1 below illustrates performance conditions for one particular condition of the apparatus which is representative of the integrated operation of the overall system. Variations are possible which can be anticipated by one skilled in the art associated with this invention. Such variations are contemplated by this invention and do not constitute departures from the claims specified below.

TABLE 1

| GAS TURBINE GENERATOR 9, 10, 11, 12 | |
|---|---|
| Output @ 59 F, Kw | 89,240 |
| Heat Rate, Btu/Kwhr | 10,180 |
| Heat Consumption, MMBtu/hr | 908.50 |
| Exhaust Flow, MLb/hr | 2,409 |
| Exhaust Temp, F. | 979 |
| WASTE HEAT BOILER NO. 14 | |

TABLE 1-continued

| | |
|---|---|
| Sec Suphtr 15 Outlet Stm Press, psig | 650 |
| Sec Suphtr 15 Outlet Steam Temp, F. | 745 |
| Sec Suphtr 15 Outlet Steam h, Btu/lb | 1,375 |
| FW Inlet h to Drum #1, Btu/lb | 442.3 |
| FW to Econ 27, Btu/lb | 250 |
| Evap Sect 16 Exit Gas Temp., F. | 530.6 |
| Input to Suphtr 15/Evap 16, MMBtu/hr | 303.237 |
| Sec Suphtr 15 Outlet Stm Flow, Mlb/hr | 266.151 |
| Pri Suphtr Outlet Stm Temp, F | 546 |
| Pri Suphtr Outlet Stm h, Btu/lb | 1,246 |
| Pri Suphtr Outlet Stm Flow, Mlb/hr | 68.431 |
| PELLET PREHEATER 3/COMBUSTOR 5 | |
| Rated Pellet Consumption, Ton/hr | 200 |
| Pellet Consumption, % of Rating | 100 |
| Pellets, Moisture Content, % | 72 |
| Pellets, Heat Content HHV, Btu/lb | 7,000 |
| Fuel Moisture Heat of Vap, Btu/lb | 970.3 |
| Dryer 3 Moisture Removal Efficncy, % | 30 |
| Dryer 3 Exit Gas Temp, F. | 250 |
| Dryer 3 Exh Gas Ht Input, MMBtu/hr | 91.771 |
| GT 11 Exh Flow to Dryer 3, Mlb/hr | 1,189.281 |
| Exhaust flow from Dryer 3, Mlb/hr | 1,275.681 |
| Sp Ht of Dryer 3 Outlet Gas, Btu/lb | 0.282 |
| Dryer 3 Bypass around Combustor 5, % | 70 |
| Dryer 3 Bypass Flow thru Conduit 7a, Mlb/hr | 892.977 |
| Combustor 5 Ht Release, MMBtu/hr | 784 |
| Prim Gas Flow to Combustor 5, Mlb/hr | 888.533 |
| Gas Flow thru Combustor 5, Mlb/hr | 1,584.838 |
| Gas Sp Ht Combustor 5 Outlet, Btu/lb | 0.305 |
| Combustor 5 Outlet Gas Temp, F. | 1,540.058 |
| Total Bypass Flow Conduits 7a + 20, Mlb/hr | 1,232.69 |
| Gas Flow to WH Blr 24, Mlb/hr | 2,817.528 |
| Gas Sp Ht to WH Blr 24, Btu/lb. | 0.294 |
| Gas Temp to WH Blr 24, F. | 1,034.36 |
| WASTE HEAT BOILER 24 | |
| Suphtr 25 Outlet Stm Press. psig | 360.34 |
| Suphtr 25 Outlet Stm Temp, F. | 635.61 |
| Suphtr 25 Outlet Steam h, Btu/lb. | 1,329.31 |
| FW Inlet h to Drum 55, Btu/lb. | 374.86 |
| F.W. to Econ 28, Btu/lb | 250 |
| Evap Sect 26 Exit Gas Temp, F. | 473.57 |
| Input to Suphtr 25/Evap 26, MMBtu/hr | 464.94 |
| Suphtr 25 Outlet Stm Flow, Mlb/hr | 487.13 |
| Econ 27 FW In-Out Δ h | 192.3 |
| Econ 27 Duty, MMBtu/hr | 64.34 |
| Econ 27 Exit Gas Temp., F. | 395.97 |
| Econ 28 FW In-Out Δh | 124.86 |
| Econ 28 Duty, MMBtu/hr | 60.824 |
| Econ 28 Exit Gas Temp., F. | 322.6 |
| Turb 36 Extr Stm to Dea, Mlb/hr | 19.52 |
| FW h From Econ 29, Btu/lb | 225 |
| FW h Fr Cond Plt 40, Btu/lb. | 88.04 |
| Econ 29 Duty, MMBtu/hr | 64.04 |
| Econ 29 Exit Gas Temp., F. | 245.36 |
| LP Steam to Condenser 40,Mlb/hr | 733.768 |
| STEAM TURBINE GENERATOR 36/37 CYCLE | |
| Conduit 38 Throttle Steam Flow, Mlb/hr | 266.151 |
| Conduit 60 Throttle Stm Flow, Mlb/hr | 487.133 |
| Turbine Gen 36/37 Elec. Output, MW | 70.383 |
| Ht Rate All Fuels, Btu/kwhr | 10,593 |
| Ht Rate Gas Firing Only, Btu/kwhr | 5,695 |
| TOTAL PLANT OUTPUT | |
| Total Gross KW Output | 160,068 |

The high mass flow ratio of turbine 11 exhaust gas to minimum air flow required to sustain combustion in combustor 10 (such exhaust gas conveying sufficient oxygen to sustain complete combustion of pellets 1 in combustor 5) is particularly suited to the needs of pellet 1 drying, ignition and burnup. The illustrative 500 to 600 F gas temperature range in conduit 4 along with the high gas mass flow rate passing through dryer 3 facilitates drying of pellets 1 through vaporization of the pellet moisture content.

The moisture released by the pellets in dryer 3 is diverted away from the ignition zone 6a in combustor 5. Pellet 1 larger particles passing through conduit 6 mix with the moisture free, higher temperature underfire gas stream from conduit 8 during the ignition process.

The heat released from the ignition zone 6a at the base of dryer 5 is partially smothered by regulation of high vapor content gas flow into said after ignition zone 6b.

Vapors generated during the drying process are heated to the working temperature of the gas stream in conduit 20 without impairment of ignition energy. Bypass gas passing through conduit 19 is regenerated and raised to a higher temperature level before being discharged to heat recovery boiler 24 through conduit 20.

The pellet drying, ignition and combustion process takes place in an environment in which total heat content of the overall system is relatively constant. Gas temperature changes are not influenced by heat transfer away from the firing zone by cooling steam and water circuits. The combustor 5 walls would be refractory lined.

Presence of pellet 1 moisture vapor during the ignition process is minimized, raising ignition energy when first igniting pellets 1. The combustion enclosure temperature is of a self regulating, self limiting character and is sufficiently low to minimize enclosure wall deposit formations as is illustrated by the data in Table 1 above.

Supplemental fuel firing is an assist only and its effectiveness is dependent upon conditioning of the fuel by hot exhaust gas from the gas turbine.

The stabilizing effects of the combined cycle waste heat upon the pellet combustion system during continuous integrated operations result from the self sufficiency of the combined cycle operation, the ability to segregate heat degradation resulting from the pellet 1 drying function from the source of gaseous heat supplied to the pellet 1 ignition function and combining the individual gaseous process mixtures after combustion of pellets 1 in a manner which results in maximum utilization of energy input to the downstream portion of said combined cycle.

The gas turbine illustrated is a high temperature power production cycle in the 1500+ F. temperature range and employs expensive fuels in its combustion process. Combustor 5 consumes a low net energy fuel derived from waste disposal needs which present sociological and environmental problems.

The objectives of the present invention overcome many past problems associated with disposal of waste fuels and reduce the demand upon premium fuels for satisfaction of community energy needs. The net effect of the integrated operation is synergistic in nature and results in conservation of natural resources and preservation of the environment in a cost effective manner which could not be achieved by either the combined cycle or pellet combustion system on a stand alone basis.

With respect to the terms "pellet" and "pelletized" as used in the above disclosure, such terms cover a broad range of waste sludge material preparation techniques. Pellet form can result from a molding or extrusion process under pressure, cakes of dewatered material which have been broken down into pieces and which are suitable for handling and feeding to dryer 3 and combustor 4 or from any alternative method which accomplishes the basic objectives of this invention. Actually the feedstock could be semi-pulverized by preparation equipment at the incineration plant. Smaller, finer sludge particles improve the performance of the overall system. Such considerations must be adapted to specific sludge preparation applications and are not a part of this invention.

Thus, it will be seen that I have provided an efficient embodiment of my invention whereby means are provided for integration of a gas turbine combined cycle steam generating plant with a pelletized sludge waste fuel incineration process, waste heat from the gas turbine exhaust being utilized to dry the waste fuel moisture prior to combustion, the released vapor being removed from the waste fuel ignition zone and returned to the gas stream downstream of the combustion zone, sufficient ignition energy being provided by the gas turbine exhaust to stabilize the waste fuel ignition process, along with means to control exhaust gas flow selectively to the waste fuel drying and combusting functions as well as around such functions to control gas temperatures in the respective waste fuel drying and combustion processes and to prevent formation of deleterious products of combustion during the incineration process, the overall efficiency of the combined plant being increased significantly.

While I have illustrated and described various embodiments of my invention, these are by way of illustration only and various changes and modifications may be made within the contemplation of my invention and within the scope of the following claims.

I claim:

1. An apparatus for integrating the firing and heat transfer components of a gas turbine combined steam generating plant with means for stabilizing combustion of high moisture content waste fuel, adapted to reheat said gas turbine exhaust gas intermediately within said combined cycle steam generating plant which comprises:
    means defining a gas turbine combined cycle steam generating plant in which said reheating of said gas turbine exhaust gas intermediately within said combined cycle is carried out;
    said gas turbine comprising a serially connected air intake, compressor, first combustor for firing gas and/or distillate fuel oil under compression, a gas turbine powered by expansion of exhaust gas from said first combustor, an exhaust port for discharge of said hot expanded exhaust gas from said gas turbine and, means whereby said gas turbine drives an energy consumer;
    a first contained gas flow path connecting to and receiving said exhaust gas from said exhaust port;
    a second contained gas flow path connected to and receiving said exhaust gas from said first contained gas flow path;
    serial means for drying and combusting said high moisture content waste fuel;
    said second contained gas flow path having means to discharge said exhaust gas selectively to said serial means drying portion and to said serial means combusting portion;
    means for combining said exhaust gas from said drying portion and from said combusting portion of said serial means, and for discharge of said combined exhaust gas, after drying and combusting, to a third enclosed gas path containing steam generating means.

2. An apparatus as recited in claim 1 and including:
    a fourth contained gas flow path interconnecting said first contained gas flow path with said third enclosed gas path adapted to bypass a portion of said exhaust gas around said means for drying and combusting said high moisture content waste fuel.

3. An apparatus as recited in claim 2 and including:
flow control means for apportioning said exhaust gas flow from said first contained gas flow path between said fourth contained gas flow path and said second contained gas flow path.

4. An apparatus as recited in claim 3 and wherein:
said flow control means for apportioning said exhaust gas flow from said first contained gas flow path between said fourth contained gas flow path and said second contained gas flow path comprises a hot gas fan positioned in said second contained gas flow path; and
said hot gas fan incorporates exhaust gas flow control means as speed control and/or damper control adapted to control rate of exhaust gas flow through said fan in response to flow measurement of exhaust gas flow through one or both of said fourth and said second contained gas flow paths.

5. An apparatus as recited in claim 3 and wherein:
said second contained gas flow path having means to discharge said exhaust gas selectively to said serial means drying portion and to said serial means combusting portion also includes means to flow said exhaust gas sequentially through said serial means for drying and combusting said high moisture content waste fuel.

6. An apparatus as recited in claim 5 and wherein:
said hot gas fan exhaust gas flow control means is additionally adapted to control gas temperature in said serial means combusting portion to a specific set point by means of control of gas flow rate.

7. An apparatus as recited in claim 5 and including means to control gas temperatures in said serial means combusting portion within a range of 1550 to 1650 F during continuous operation.

* * * * *